United States Patent Office 2,747,984
Patented May 29, 1956

2,747,984

CONCENTRATED HERBICIDE COMPOSITIONS

Leeds C. White, Jr., Bay City, Mich., assignor to The Dow Chemical Company, Midland, Mich., a corporation of Delaware No Drawing. Application March 18, 1954,
Serial No. 417,229

8 Claims. (Cl. 71—2.6)

The present invention is concerned with herbicides and is particularly directed to concentrated herbicide compositions including as active ingredients the isopropyl and normalbutyl esters of 2,4-dichlorophenoxy-acetic acid.

In recent years, the alkyl esters of 2,4-dichlorophenoxy-acetic acid (hereinafter referred to as 2,4-D) have been widely employed as active constituents of growth control compositions for the suppression of the growth and killing of weeds and undesirable brush. In such use, the esters are generally employed in the form of a petroleum distillate or organic solvent solution, or aqueous dispersion or emulsion. Such compositions are usually prepared from a concentrated herbicide composition or concentrate composition containing an alkyl ester of 2,4-D together with one or a plurality of additaments including organic solvents, petroleum distillates, and dispersing and emulsifying agents. Such concentrates are articles of commerce ordinarily available in the form of viscous liquids.

The distribution and use of many of the commercially available concentrate formulations have constituted a very serious problem to the manufacturer and ultimate user due to the fact that they tend to solidify or freeze at temperatures well above the freezing point of water. Such temperatures are commonly encountered in transit and storage, since the valuable ester-type concentrates are preferably supplied the distributor during the winter months prior to the growing season. Frequently the concentrates may become completely solid during the transportation and storage interval. The freezing and subsequent thawing oftentimes causes stratification of the concentrates as well as the precipitation of solid materials upon the interior surfaces of containers. Such formulations must be brought to the liquid state through the application of heat and thereafter thoroughly agitated in order to return their homogeneity. As a result, concentrated herbicide compositions, which have a tendency to freeze at commonly encountered winter temperatures, have been considered undesirable.

Some manufacturers have attempted to overcome the freezing problem in 2,4-D alkyl ester formulations by means of anti-freeze or coupling agents such as ethanol or higher alcohols. Other formulators have tried to improve the freezing properties through the use of aromatic solvents such as toluene. However, such practices have not been entirely satisfactory due to the fact that more desirable freezing properties are only obtained through the use of large amounts of alcohol or aromatic solvent. The alcohol or solvent thus acts as a diluent so that concentrate formulations contain undesirably low proportions of the alkyl ester of 2,4-D. Further, the use of such diluents increase formulation as well as transportation costs of the concentrate materials.

It is an object of the present invention to provide concentrated herbicide compositions which have very desirable freezing properties and include alkyl esters of 2,4-D as active ingredients. Another object is the production of liquid herbicide compositions which contain a high concentration of alkyl esters of 2,4-D as active ingredients and are not subject to solidification or freezing at temperatures commonly encountered in transit and storage. A further object is the provision of 2,4-D, alkyl ester concentrates which are highly resistant to solidification and freezing at temperatures commonly encountered in transit and storage and by means otherwise than the employment of relatively inactive diluents. Another object is to provide concentrated herbicide compositions which have the aforementioned desirable properties when formulated with relatively cheap oils such as the petroleum hydrocarbon distillates, e. g. Stoddard solvent, fuel oil, kerosene and naphtha. Other objects will become apparent from the following specification and claims.

According to the present invention, it has been discovered that concentrated herbicide compositions comprising as a major active ingredient a mixture of the isopropyl and normalbutyl esters of 2,4-D have very desirable freezing properties. More particularly, it has been discovered that concentrated herbicide compositions in which the active material comprises a mixture of from 15 to 45 percent by weight of the isopropyl ester of 2,4-D in from 85 to 55 percent by weight of the normalbutyl ester of 2,4-D exhibit unusually high resistance to solidification or freezing at temperatures commonly encountered in transit and storage during the winter months. This desirable property also characterizes compositions consisting only of the normalbutyl and isopropyl esters of 2,4-D in the stated proportions. Many such compositions do not freeze when subjected for a period of several days to temperatures as low as 0° C. Further, after freezing, the compositions readily return to the liquid state, or thaw with little loss of homogeneity. The ability to resist freezing at temperatures considerably lower than the thaw temperature is an outstanding and advantageous characteristic of the compositions of the present invention.

Preferred compositions are those containing from 30 to 40 percent by weight of the isopropyl ester of 2,4-D and from 70 to 60 percent of the normalbutyl ester of 2,4-D, said percentages being based upon the combined weight of the esters present in the compositions. Such compositions are highly resistant to freezing. Even when frozen, compositions containing only the specified esters in the preferred proportions return to the liquid state at temperatures of 3° C. or somewhat lower. This is in distinction to an actual freezing point for the individual esters of about 27° C. for the normalbutyl ester and of about 8° C. for the isopropyl ester.

It is a particular advantage of the present invention that concentrated herbicide compositions having even more enhanced freezing properties may be formulated from inexpensive solvent fractions from petroleum and the stated proportions of the 2,4-D esters. A further advantage is that herbicide compositions containing a very high acid equivalent of the esters are not subject to solidification or freezing under the temperature conditions commonly encountered in the winter months.

When operating in accordance with the present invention, the isopropyl ester of 2,4-D is mechanically mixed with the normalbutyl ester of 2,4-D in the proportion of from 15 to 45 parts by weight of the isopropyl ester in from 85 to 55 parts by weight of the normalbutyl ester to prepare concentrated herbicide compositions containing the desired proportions of active ingredients. Such mixing operations are carried out with ester products which are at a temperature somewhat above their melting points, i. e. with ester products in the liquid phase and under liquid conditions in the mixing vessel. Heating during the mixing operation may be employed if desired.

In another embodiment, the isopropyl and normalbutyl esters of 2,4-D or a mixture of such esters, as above prepared, may be dissolved in one or more hydrocarbon oils such as (1) aromatic hydrocarbon oils, e. g. xylene, benzene, toluene and the aromatic naphthas, and (2) the petroleum hydrocarbon distillates to produce concentrate compositions having very desirable and enhanced resistance to freezing. In such compositions the esters should be employed in the afore-stated critical proportions, said proportions being based upon the combined weight of the isopropyl and normalbutyl esters of 2,4-D present in the formulation. These oil-base compositions may contain from 35 to 95 percent by weight of the combined isopropyl and normalbutyl esters of 2,4-D and correspondingly from 65 to 5 percent by weight of the solvent oil. Such compositions are not subject to freezing when exposed to temperatures substantially below 0° C. In many cases, the compositions do not freeze when subjected for prolonged periods to temperatures of from —10° to —20° C. or lower. The preferred oils to be employed in the compositions are the solvent fractions from petroleum including readily available petroleum hydrocarbon distillates or base oils such as naphtha, fuel oil, Stoddard's solvent, kerosene, etc. Concentrate base oil herbicide compositions comprising the mixture of esters and the inexpensive petroleum hydrocarbon distillates constitute a preferred embodiment of the present invention.

The hydrocarbon oil compositions and undiluted combinations of the isopropyl and normalbutyl esters of 2,4-D may be admixed or otherwise modified with emulsifying agents to prepare concentrate herbicide compositions in the form of emulsifiable liquids. The type of emulsifying and/or dispersing agent and amount thereof employed is dictated by the ability of the agent to bring about the wetting of the plant surfaces ultimately treated with the ester formulation and/or to facilitate the dispersion of the ester compounds in the dispersion medium upon dilution with a liquid carrier, such as water. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like. In such compositions, the emulsifying and dispersing agent is ordinarily employed in the amount of from about 1 to 12 percent by weight of the final composition. Concentrated herbicide compositions comprising the mixture of esters, a water immiscible organic solvent such as a petroleum distillate and an emulsifying and dispersing agent constitute a further preferred embodiment of the present invention.

When operating in accordance with the present teaching, compositions readily may be prepared which contain a very high concentration of active agent; even compositions containing as much as from 6 to 8 pounds of 2,4-D acid (acid equivalent) per U. S. gallon. Many of these highly concentrated herbicide compositions do not freeze when subjected for prolonged periods to temperatures as low as from —5° to —15° C. In many cases, the compositions after freezing, thaw at temperatures below 0° C.

The concentrate herbicide compositions as prepared in accordance with the teachings of the present invention, may be applied without modification to plants and plant parts for the suppression of vegetative growth. In a further use, the compositions may be diluted with a solvent carrier or dispersed in water, with or without the aid of a dispersing and emulsifying agent, to prepare finished plant treating compositions containing any desired amount of active ingredient.

The following examples illustrate the invention but are not to be construed as limiting.

EXAMPLE 1

Thirty parts by weight of the isopropyl ester of 2,4-dichlorophenoxyacetic acid and 90 parts of the n-butyl ester of 2,4-dichlorophenoxyacetic acid were mechanically mixed together to prepare a solution containing about 21 percent isopropyl ester and about 79 percent n-butyl ester. The mixing operation was carried out with ester products which were in the liquid phase and under liquid conditions in the mixing vessel. This solution constitutes a herbicide concentrate characterized by a very low freezing temperature.

In a further operation, the above homogeneous mixture was successively diluted with 20 parts by weight of Triton X-100 (an alkylated aryl polyether alcohol) and 123.6 parts of an aromatic naphtha (boiling at from 354° to 490° F.) to prepare a second herbicide concentrate composition in the form of an emulsifiable liquid. This composition contained 3.5 pounds of 2,4-D acid per U. S. gallon. Portions of the emulsifiable composition were placed in cold boxes at temperatures of —18° C., —11° C. and 0° C. and seeded 19 hours later with crystals of the isopropyl ester of 2,4-dichlorophenoxyacetic acid. After 20 days storage, the portions were examined for evidence of crystal formation. The examination indicated that no crystal formation had taken place at any of the temperatures of storage.

EXAMPLE 2

37.2 parts by weight of the isopropyl ester of 2,4-dichlorophenoxyacetic acid and 112.8 parts of the n-butyl ester of 2,4-dichlorophenoxyacetic acid were mixed together in the manner as described in Example 1 to prepare a solution containing 24.8 percent isopropyl ester and 75.2 percent n-butyl ester. This material constituted a low melting herbicide concentrate.

100 parts by weight of the foregoing solution were then successively diluted with 20 parts by weight of Triton X-100 and 100.3 parts of aromatic naphtha to produce a second herbicide concentrate in the form of an emulsifiable liquid containing 4 pounds of 2,4-D acid per U. S. gallon. Portions of this composition were placed in cold boxes at temperatures of —17°, —9° and +7° C. and shortly thereafter seeded with crystals of the isopropyl ester of 2,4-dichlorophenoxyacetic acid. After 5 weeks storage, the portions were examined for evidence of crystal formation. The examination showed that no crystal formation had taken place in the emulsifiable compositions at any of the storage temperatures.

EXAMPLE 3

74.4 parts by weight of the isopropyl ester of 2,4-dichlorophenoxyacetic acid and 115 parts of n-butyl ester of 2,4-dichlorophenoxyacetic acid were mechanically mixed together in the liquid phase to prepare a herbicide concentrate composition containing about 39 percent isopropyl ester and 61 percent n-butyl ester.

In a similar manner a composition was prepared containing 19 percent by weight of the isopropyl ester of 2,4-dichlorophenoxyacetic acid and 81 percent of the n-butyl ester of 2,4-dichlorophenoxyacetic acid.

These herbicide compositions were diluted with emulsifying agent and solvent to produce liquid emulsifiable concentrates having the following parts by weight of ingredients and containing 5 pounds of 2,4-D acid per gallon.

|  | Composition A | Composition B |
|---|---|---|
| Isopropyl ester of 2,4-dichlorophenoxyacetic acid | 74.4 | 37.2 |
| n-Butyl ester of 2,4-dichlorophenoxyacetic acid | 115.0 | 153.5 |
| Alkylphenol-alkylene oxide condensation product | 11.2 | 11.2 |
| Highly refined petroleum sulfonate | 5.6 | 5.6 |
| Aromatic naphtha | 74.6 | 72.6 |

Portions of Compositions A and B were placed in cold boxes at temperatures of −17° C., −9° C. and −5° C. and shortly thereafter seeded with crystals of the isopropyl ester of 2,4-dichlorophenoxyacetic acid. After three months storage, the sample portions were examined for evidence of crystal formation. No crystal formation was observed in either emulsifiable composition at any of the storage temperatures.

EXAMPLE 4

The following parts by weight of ingredients were mechanically mixed together to prepare herbicide concentrates in the form of emulsifiable liquids containing 6 pounds of 2,4-D acid per gallon.

*Composition A*

| | |
|---|---|
| Isopropyl ester of 2,4-dichlorophenoxyacetic acid | 26.0 |
| n-Butyl ester of 2,4-dichlorophenoxyacetic acid | 52.8 |
| Emcol H-77 (fatty acid condensation product of a polyhydric alcohol) | 5.0 |
| Aromatic naphtha | 16.2 |

*Composition B*

| | |
|---|---|
| Isopropyl ester of 2,4-dichlorophenoxyacetic acid | 13.0 |
| n-Butyl ester of 2,4-dichlorophenoxyacetic acid | 66.0 |
| Emcol H-77 | 5.0 |
| Aromatic naphtha | 16.0 |

*Composition C*

| | |
|---|---|
| Isopropyl ester of 2,4-dichlorophenoxyacetic acid | 31.5 |
| n-Butyl ester of 2,4-dichlorophenoxyacetic acid | 49.5 |
| Alkylphenol-alkylene oxide condensation product | 4.0 |
| Highly refined petroleum sulfonate | 2.0 |
| Aromatic naphtha | 13.0 |

*Composition D*

| | |
|---|---|
| Isopropyl ester of 2,4-dichlorophenoxyacetic acid | 25.2 |
| n-Butyl ester of 2,4-dichlorophenoxyacetic acid | 58.6 |
| Alkylphenol-alkylene oxide condensation product | 4.0 |
| Highly refined petroleum sulfonate | 2.0 |
| Aromatic naphtha | 10.2 |

Portions of each of these compositions were placed in a cold box at a temperature of −7° C. and shortly thereafter seeded with crystals of the isopropyl ester and n-butyl ester of 2,4-dichlorophenoxyacetic acid. After one week, the sample portions were examined for evidence of crystal formation. No evidence of crystal formation was observed in any of the emulsifiable compositions.

I claim:

1. A concentrate composition comprising as an active herbicidal toxicant a mixture of the isopropyl ester of 2,4-dichlorophenoxyacetic acid and the n-butyl ester of 2,4-dichlorophenoxyacetic acid, said isopropyl ester comprising from 15 to 45 percent by weight of the combined weight of said isopropyl and n-butyl esters present in the composition.

2. A concentrate composition as claimed in claim 1 wherein the active herbicide toxicant is in intimate admixture with an aromatic naphtha, said active herbicide toxicant comprising from 35 to 95 percent by weight of the combined weight of said active herbicide toxicant and aromatic naphtha present in the composition, said composition being characterized as not subject to freezing at temperatures as low as 0° C.

3. A concentrate composition comprising the composition claimed in claim 2 in intimate admixture with from 1 to 12 percent by weight of an emulsifying and dispersing agent.

4. A concentrate composition as claimed in claim 1 wherein the isopropyl ester comprises from 30 to 40 percent by weight of the combined weight of said isopropyl and n-butyl ester present in the composition.

5. A concentrate composition as claimed in claim 4 wherein the active herbicidal toxicant is in intimate admixture with a hydrocarbon oil, said active herbicide toxicant comprising from 35 to 95 percent by weight of the combined weight of said active herbicide toxicant and hydrocarbon oil present in the composition, said composition being characterized as not subject to freezing at temperatures as low as 0° C.

6. A concentrate composition as claimed in claim 1 wherein the active herbicidal toxicant is in intimate admixture with a hydrocarbon oil, said active herbicidal toxicant comprising from 35 to 95 percent by weight of the combined weight of said active herbicidal toxicant and hydrocarbon oil present in the composition, said composition being characterized as not subject to freezing at temperatures as low as 0° C.

7. A concentrate composition as claimed in claim 1 wherein the active herbicidal toxicant is in intimate admixture with a petroleum hydrocarbon distillate, said active herbicidal toxicant comprising from 35 to 95 percent by weight of the combined weight of said active herbicide toxicant and petroleum hydrocarbon distillate present in the composition, said composition being characterized as not subject to freezing at temperatures as low as 0° C.

8. A low-freezing concentrated liquid herbicidal composition comprising a mixture of the n-butyl and isopropyl esters of 2,4-dichlorophenoxyacetic acid in proportions of from about 55 to about 77 percent of the n-butyl ester and correspondingly from about 45 to about 23 percent of the isopropyl ester, said percentages being by weight based on the sum of said esters, said esters being present in a total concentration of at least 3 pounds of 2,4-dichlorophenoxyacetic acid equivalent per gallon of composition.

References Cited in the file of this patent

FOREIGN PATENTS 494,813     Canada _____ July 28, 1953